March 10, 1959 S. D. ROLLÉ 2,877,415
APPARATUS FOR MEASURING VELOCITY AND ACCELERATION
OF A PROPELLED OBJECT
Filed July 21, 1953 2 Sheets-Sheet 1

INVENTOR.
SYLVAN D. ROLLÉ
ATTORNEYS

March 10, 1959
S. D. ROLLÉ
2,877,415
APPARATUS FOR MEASURING VELOCITY AND ACCELERATION
OF A PROPELLED OBJECT
Filed July 21, 1953
2 Sheets-Sheet 2
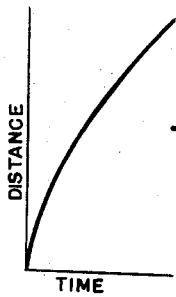
FIG. 3.
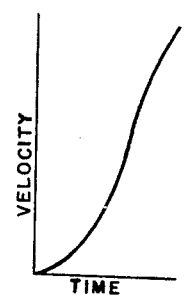
FIG. 4.
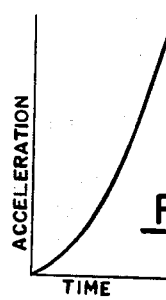
FIG. 5.
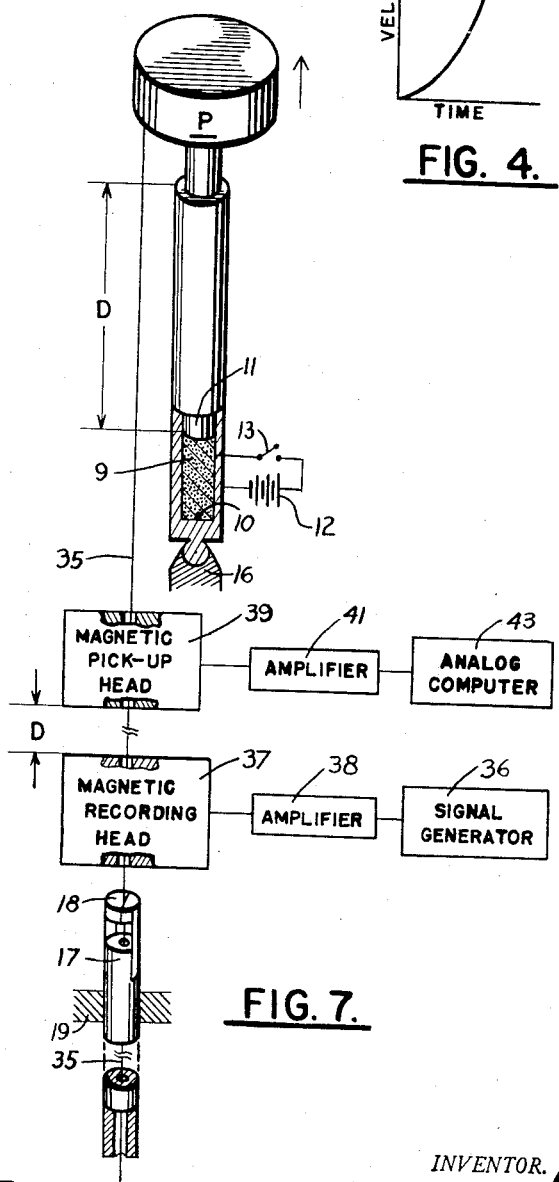
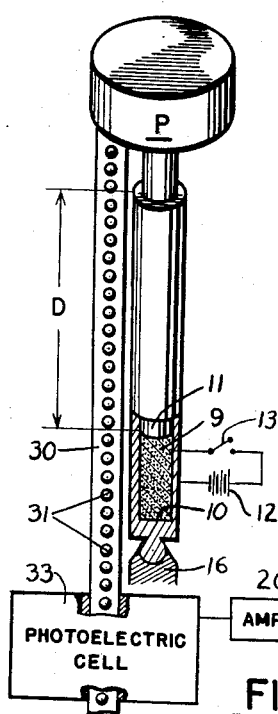
FIG. 6.
FIG. 7.
INVENTOR.
SYLVAN D. ROLLÉ
BY
W. E. Thibodeau, A. W. Dew
and H. I. Forman
ATTORNEYS United States Patent Office 2,877,415
Patented Mar. 10, 1959

2,877,415
APPARATUS FOR MEASURING VELOCITY AND ACCELERATION OF A PROPELLED OBJECT

Sylvan D. Rollé, Philadelphia, Pa.

Application July 21, 1953, Serial No. 369,538

3 Claims. (Cl. 324—70)

(Granted under Title 35, U. S. Code (1952), sec. 266)

The invention described herein may be manufactured and used by or for the Government for governmental purposes without the payment of any royalty thereon.

This invention relates to apparatus and methods pertaining to the measurement of velocity and acceleration of a propelled object. The apparatus and methods of the invention are of particular usefulness in determining the performance characteristics of catapults for the ejection of airplane personnel and, although hereinafter described with reference to such use, it is to be understood that such specific application is merely illustrative.

In the development and design of catapults for the ejection of airplane personnel, it is necessary to measure the velocity and acceleration of the catapult during the power stroke of the ejection mechanism. An exact knowledge of this data is necessary since there are fairly definite limits to the amount of acceleration and rate of increase of acceleration that the human body will tolerate. If the acceleration is greater than that which may be tolerated, it will tend to cause the occupant to "black out." However, if the acceleration and velocity are less than that required, it will either not eject the occupant from the plane, or it will not eject him far enough beyond the plane to avoid his being hit by rearward portions of the plane once he is ejected. A number of methods of measuring acceleration have been used with varying degrees of success and many other methods are available. However, it has been found that many of the methods, which have heretofore been available, have not been highly suitable for use in connection with catapult development because of either poor accuracy or difficulty of application.

It is, therefore, an object of this invention to provide simple and more reliable methods for accurately accumulating data to ascertain the velocity and acceleration of a propelled or ejected object.

It is a further object of this invention to provide simple and reliable apparatus which will accomplish the methods of accurately accumulating data to ascertain the velocity and acceleration of a propelled or ejected object.

In carrying out these objects, the apparatus carried by the mass being measured is kept to a minimum weight, thereby substantially eliminating any resistance tending to retard movement of the mass. For this purpose, a flexible, light-weight magnetizable tape or wire is the sole element carried by the projected mass, the rest of the necessary apparatus being independent of and separate therefrom.

In one form of the invention, a series of equally spaced magnetic signals is impressed along the length of the tape or wire by running it, at constant velocity, through a magnetic recording head supplied with a constant frequency signal. A suitable length of this wire is then affixed to the projectile and arranged in such a manner that, during travel of the projectile, the wire will pass through a magnetic pickup such as the pickup head of a magnetic recorder. The frequency of the impressed signals picked up by the recorder, i. e., the number of signals per unit length of time as detected with this arrangement, will be proportional to the average velocity of the wire for that unit of time. A suitable frequency meter connected to the head indicates the velocity of the wire. Between certain points in the frequency meter circuit, there is a voltage which is proportional to the frequency (velocity) impressed on the meter; this voltage can be impressed on a differentiation circuit to obtain a voltage which is proportional to the acceleration. Permanent data may be obtained by continuously recording the respective voltage measurements (velocity and acceleration) as a function of time. As an alternate modification to this form of the invention, a member having a series of surface irregularities such as notches or holes equally spaced along its length, instead of having a magnetic signal impressed upon it, may be used together with suitable electrical apparatus to measure the frequency of passage of these irregularities past a fixed point in the system.

In another form of the invention, a blank magnetizable tape or wire carried by the propelled mass is passed through a magnetic recording head. Magnetic energy supplied by a constant frequency pulsating current to the head impresses magnetic pulses on the tape or wire during propulsion of the mass, the spacing of which varies directly with the velocity of the mass. The tape or wire is then passed through a magnetic pickup head so placed with respect to the recording head that the magnetized portion of the wire passes through it at a point along the path of travel where the mass and associated tape or wire are at constant velocity or a constant known acceleration. As an alternative, the tape or wire may at some later time be passed through a magnetic pickup at constant velocity. The output of the pickup would thus have a frequency inversely proportional to the velocity of the mass and associated tape or wire during the magnetizing cycle. By then feeding the pickup output to an analog computer the velocity and acceleration of the mass may be determined. It will be noted that, in this form of the invention, the motion data of the mass may also be conveniently determined at any time subsequent to its propulsion since the tape or wire contains a permanent travel-time record.

Other and further objects and many of the attendant advantages are those inherent in the methods and apparatus hereinafter illustrated, described and claimed.

The invention is illustrated with reference to the drawings in which:

Fig. 3 illustrates a portion of a distance vs. time chart as recorded by the graphic pulse count-time recorder shown in Fig. 2;

Fig. 4 is a portion of a velocity vs. time chart as recorded by the graphic velocity recorder shown in Fig. 2;

Fig. 5 is a portion of an acceleration vs. time chart as recorded by the graphic acceleration recorder shown in Fig. 2;

Fig. 6 is a view similar to Fig. 2 of a modified form of the system illustrated in Fig. 2, incorporating the use of a different type signal member; and Fig. 7 is a view similar to Fig. 2 of another form of measurement system in accordance with this invention.

Figure 1:
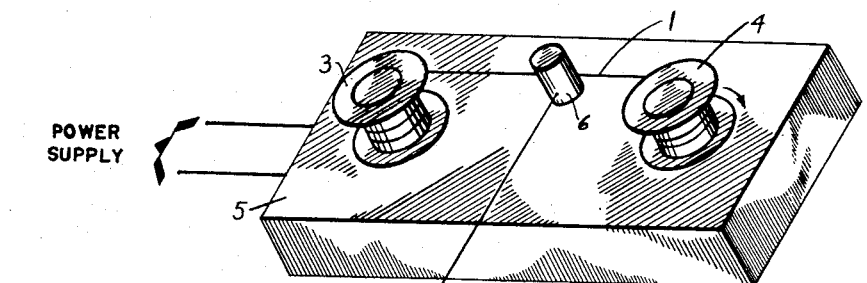
Fig. 1 is a view, partly in schematic form, of the equipment used to impress a magnetic signal on a member for use in the measurement system shown in Fig. 2.

Referring more particularly to the drawings, one system of the present invention is so constructed that a wire or other member which has been previously impressed with discrete magnetic signals is carried by the object, the measurements of which are to be determined. In this system, the wire is prepared prior to attachment to the object in a manner similar to that illustrated in Fig. 1. As shown, the magnetic wire 1, carried upon a storage reel 3 is threaded through a magnetic recording head 6 and taken up on a take-up spool 4. As the wire passes through the recording head 6 at constant velocity, a series of constant frequency signals, generated by a constant frequency electric signal generator 7 and amplified by amplifier 8 is fed into the magnetic recorder head 6 and is impressed in a conventional manner on wire 1. Since the wire is traveling at constant velocity and the signals are impressed at constant frequency, it is obvious that the signals will be equally spaced along the length of the wire. Although any type of constant frequency electric signal generating means may be used, it has been found that a vacuum-tube tuning fork or crystal controlled oscillator is preferred because of greater accuracy and control. In this same respect, any of the well-known types of magnetic recording heads and signal amplifiers may be used as a matter of choice.

Figure 2:
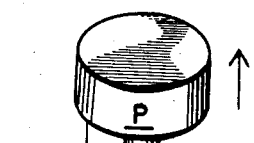
Fig. 2 is a schematic view illustrating one form of measurement system in accordance with this invention, certain parts of the apparatus being shown in front elevation with portions thereof broken away to show structural details.
Figure 2:
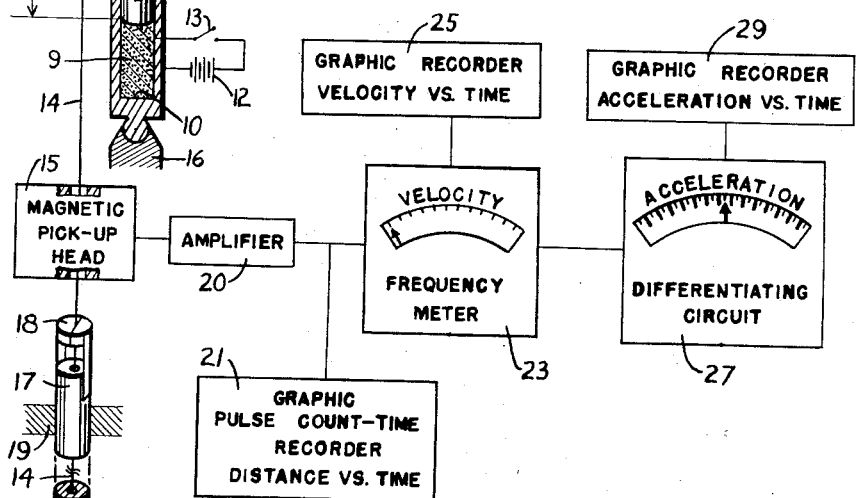

After the series of equally spaced signals have been impressed on the wire 1, a suitable length thereof is attached to the object to be measured. Referring particularly to Fig. 2, let us assume, for purposes of discussion, that an object P is propelled by an experimental catapult (not shown) of the type used in aircraft for the ejectment of personnel and of which test data of velocity and acceleration is desired; the wire would thus be attached to a trailing or other suitable portion of the object. In order to obtain a complete record of the velocity and acceleration of the object, the wire should be no shorter than the distance D through which the object is accelerated. Of course, substantially any length of wire may be used depending upon the amount of data desired. As diagrammatically shown in Fig. 2, the trailing wire 14 is threaded through a magnetic pickup head 15 and is extended into a housing 17 to prevent entanglement and to offer a substantially frictionless guide therefor. This housing is composed of a tube-like member having an internal diameter of slightly greater dimension than the wire diameter such that entanglement of the wire is prevented. A suitable clamp 19 is provided to hold the housing 17 in a fixed position. In the event it is desired to use a relatively great length of wire, a free-wheeling reel or other suitable storage device may be used in conjunction with the tubular housing 17, to facilitate handling of the wire. Adjacent the outlet end of the housing 17 are supported a pair of finger-like, felt pads 18 for guiding the wire into operative engagement with the magnetic head. It will be noted that the wire is the only measuring apparatus which is fixed to or carried by the object. Thus, due to the relatively negligible weight of the wire and the substantially frictionless wireguide elements 17, 18 movement of the object P is effectively unimpeded by any of the measurement structure.

The catapult, by way of illustration, is energized by means of an explosive charge 9, placed in the chamber 10 which houses the catapult piston 11. The chamber 10 is rigidly held in a fixed position relative to the housing 17 by any suitable base 16. Closing a switch 13 completes the electrical circuit through a battery 12 and an electric igniter (not shown) thereby detonating the explosive charge to propel the object P.

The magnetic pickup head 15, which forms a part of the signal translating equipment, is operatively positioned adjacent to the trailing wire 14 to receive the impressed signals therefrom. Electrically connected to the pickup head 15 is an amplifier 20 for amplifying the received signals and for delivering them to a series of measuring and recording instruments, hereinafter described. The frequency of the signal received by the pickup head will be directly proportional to the velocity of the catapult. By delivering the amplified signals to a graphic pulse count-time recorder 21, a permanent record similar to that shown in Fig. 3 may be obtained. This record represents the distance of object travel with respect to time, the recorder having automatically added the number of signals (of known spacing) received by the pickup head 15 for any desired interval of time.

A suitable frequency meter 23 is also connected to the output side of the amplifier 20 to indicate the velocity of the propelled object. The frequency meter 23 is similar to the pulse counter 21 in that it is responsive to the passage of a plurality of signals passing a reference point in a given unit of time. Thus, the frequency (signals per unit time), which varies directly with velocity, may be indicated in terms of velocity on the face of the frequency meter to supply velocity characteristics of the object during travel. Associated with the frequency meter 23 is a graphic recorder 25 which may be used to produce a permanent record of the object velocity in the form of a graph similar to that shown in Fig. 4. As shown, the graph indicates velocity as compared to time; thus the velocity of the object at any particular time of object travel may be readily determined. It will be noted that the velocity of the object increases during acceleration, as indicated by the curve in Fig. 4.

The average acceleration of the object at any time may be determined by measuring the slope of the velocity-time curve at that particular point. However, a differentiating circuit and meter 27 may be used in association with the frequency meter to indicate acceleration during travel of the object. A permanent record of the indicated acceleration values may be made by means of a graphic recorder 29 associated with the differentiating circuit and meter 27. The recorder produces a graph similar to that shown in Fig. 5 which indicates the average acceleration at any instant of object travel.

It may be found desirable in some instances to avoid the use of a magnetic circuit, namely, the magnetic recording head 15. In such cases, a tape 30 may be used, such as that shown in Fig. 6, having a series of equally spaced marks, indentations, impressions or surface irregularities 31 which will provide a series of signals similar to the constant frequency signals magnetically impressed on the tape or wire 1. The signal member 30 is attached to the object P in the same manner as the wire 14; the same signal receiving and translating equipment may also be used to obtain the desired data. However, in place of a magnetic pickup head 15, any of many well-known surface irregularity detecting devices may be used to receive the signals as the object and attached signal member are propelled. A photoelectric cell 33 is shown in Fig. 6, by way of example, to illustrate one device operable to detect the passage of the impressions or holes 31 in the signal member 30. The signals received by the photoelectric cell 33 are electrically conducted to the amplifier 20 and thence to the remaining signal responsive equipment heretofore discussed.

The modification disclosed in Fig. 7 of the drawings illustrates another form of the invention wherein the tape or wire forms a permanent record of the travel data of the propelled object P.

In this embodiment, a suitable length of magnetic wire or tape 35 is attached to the object P in blank or erased form, i. e., without any signals impressed thereon. The trailing portion of the wire 35 is guided for unrestricted and substantially frictionless movement by the guide members 17, 18, as heretofore described. A magnetic recording head 37 is operatively associated with the wire 35 to impress thereon a series of discrete, constant frequency signals, produced by the constant frequency electric signal generator 36, and amplified by the amplifier 38, during propulsion of the object. It will thus be realized that while the signals are impressed at a constant frequency with respect to time, the signals are in relative distance, unequally spaced along the wire 35 during acceleration of the object. The spacing in distance between successive signals will therefore vary directly with velocity; the difference between successive velocity values will vary directly with acceleration. By a sequential comparison of the spacing of adjacent signals with respect to a constant interval of time (determined by the frequency of the signal produced by generator 36) the velocity and acceleration of the object may be computed.

Since the wire 35 in this modification forms a permanent record, it may be desirable to retrieve the wire from the object for later analysis rather than provide instrumentation for immediate determination at the test site. In such event, no additional equipment is needed at the time of propulsion. The retrieved wire record may thus be preserved for future use in association with interpreting equipment hereinafter described.

The equipment and method for analyzing the record are somewhat similar whether analysis is desired at the time of propulsion of the catapult or at some future time and will, therefore, be described simultaneously.

A magnetic pickup head 39 is placed in signal receiving relationship with the wire 35 at a strategic position, that is, a position at which the wire is traveling at substantially constant velocity. In Fig. 7, which illustrates this embodiment, the pickup head 39 is spaced from the recording head 37 a distance corresponding to the length D of the acceleration stroke of the catapult 36. At this position, the signal contained section of the wire will be moving at constant velocity since the object P will be moving at a substantially constant velocity immediately after acceleration by the catapult. Inasmuch as the signals are impressed on the wire by the recording head 37 at a constant frequency, the time interval between each succeeding signal is uniform, but the spacial distance between each of them will be varied depending upon the velocity of the object at that time. Thus, when the pickup head receives the signals, as the wire is moving at constant velocity, the spacial interval between any two signals will vary according to the velocity of the object and attached wire at the time it originally passed by the recording head; the frequency of the received signals (signals per unit time) will, therefore, be indicative (inversely proportional) of the original incremental wire velocity.

Should the alternative procedure be followed, wherein the record wire is to be interpreted at a time subsequent to the travel of the object, the wire is moved past the recording head 39 at a constant velocity by any suitable means. In either event, it will be appreciated that the pickup head 39 must be placed in a position at which the record wire is traveling at a constant velocity to uniformly compare the spacing in distance between any two impressed signals with respect to time. The signals thus received by the magnetic recording head 39 are amplified by means of an amplifier 41 and are then fed to an analog computer or other similar differentiating equipment 43 which is tabulated to sequentially receive and interpret, in terms of velocity and acceleration, the series of magnetic signals. The design and operation of this equipment may be made on the basis of well-known velocity and acceleration equations.

If desired, the recorded data can also be interpreted by a technician by taking direct measurements from a photographic record made according to the following procedure: The signal impressed wire, subsequent to travel, is fed past the original pickup head at a constant velocity; the picked up signals are fed into an oscilloscope to produce a visible reproduction of the recorded signals, photographs are taken of the signals as reproduced by the oscilloscope screen, using a conventional moving film method, maintaining the film speed equal to that of the wire during the photographing process. After the film is developed the technician is then able to measure the actual distances between each signal.

Summary

By virtue of this invention, the velocity and acceleration of substantially any propelled object may be determined. The signal carrier; i. e., the tape or wire, is the only equipment carried by the propelled object and, due to its negligible weight, offers substantially no resistance to the travel of the object. Thus, extremely accurate and dependable results may be obtained. Furthermore, the use of such simple apparatus facilitates the use of this device in the field, as well as in the laboratory, without a sacrifice in the accuracy of the results. In view of the expendability of the tape or wire, the cost of obtaining the data is negligible; thus, where the object is not retrievable (shells, missiles, etc.), the only loss of equipment is the attached tape or wire. In such instances, although the tape or wire is lost, by recording the data during movement of the object, a permanent record may be obtained.

It will be recognized that in both forms of the invention, the signals are equally spaced apart; in the first disclosed embodiment the impressed signals are equally spaced in distance and in the second embodiment the signals are equally spaced in time. Thus, in either case, there is always one value which remains constant, thereby facilitating computation and measurement of the desired values.

I claim:

1. In a system for determining the acceleration at which a mass is ejected from a moving aircraft, the combination of a guideway fixed to said aircraft, a magnetic recording head, a magnetic record medium fixed to said mass and extending through said recording head and said guideway, and means for applying to said head discrete voltage pulses at a constant frequency whereby the spacing of said pulses as recorded on said medium is a function of the acceleration of said mass.

2. A system according to claim 1 wherein a magnetic pick-up head is spaced from said recording along said record medium a distance at least as great as the distance through which said mass is accelerated and wherein the output of said pick-up head is applied to an analog computer.

3. A system according to claim 1 wherein said record medium is a magnetic tape.

References Cited in the file of this patent

UNITED STATES PATENTS

| | | |
|---|---|---|
| 1,357,281 | Du Pont | Nov. 2, 1920 |
| 1,854,949 | Mead | Apr. 19, 1932 |
| 1,871,404 | Brown | Aug. 9, 1932 |
| 2,378,388 | Begun | June 19, 1945 |
| 2,602,837 | Foster | July 8, 1952 |
| 2,656,419 | Dingley | Oct. 20, 1953 |
| 2,675,871 | Turnbull et al. | Apr. 20, 1954 |